(12) United States Patent
Syrivelis et al.

(10) Patent No.: US 11,765,188 B2
(45) Date of Patent: Sep. 19, 2023

(54) REAL-TIME DETECTION OF NETWORK ATTACKS

(71) Applicant: Mellanox Technologies, Ltd., Yokneam (IL)

(72) Inventors: Dimitrios Syrivelis, Volos (GR); Dimitrios Kalavrouziotis, Papagou (GR); Paraskevas Bakopoulos, Ilion (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 440 days.

(21) Appl. No.: 17/145,343

(22) Filed: Jan. 10, 2021

(65) Prior Publication Data

US 2022/0210174 A1 Jun. 30, 2022

(30) Foreign Application Priority Data

Dec. 28, 2020 (GR) .............................. 20200100750

(51) Int. Cl.
*H04L 9/40* (2022.01)
*H04L 69/16* (2022.01)
*G06N 5/04* (2023.01)
*G06N 3/04* (2023.01)

(52) U.S. Cl.
CPC .......... *H04L 63/1425* (2013.01); *G06N 3/04* (2013.01); *G06N 5/04* (2013.01); *H04L 63/1416* (2013.01); *H04L 69/16* (2013.01)

(58) Field of Classification Search
None
See application file for complete search history.

(56) References Cited

U.S. PATENT DOCUMENTS

| 7,647,411 | B1 * | 1/2010 | Schiavone | H04L 51/226 |
| | | | | 709/224 |
| 7,660,248 | B1 * | 2/2010 | Duffield | H04L 41/5022 |
| | | | | 370/230.1 |
| 8,209,756 | B1 * | 6/2012 | Guruswamy | H04L 63/1466 |
| | | | | 713/188 |
| 9,336,239 | B1 | 5/2016 | Hoffmann et al. | |
| 9,764,468 | B2 * | 9/2017 | Izhikevich | B25J 9/161 |
| 9,973,529 | B1 * | 5/2018 | Bharrat | H04L 63/1416 |
| 10,027,695 | B2 * | 7/2018 | Hohndel | G06F 21/554 |
| 10,341,294 | B2 * | 7/2019 | Mikami | H04L 63/0245 |
| 10,609,061 | B2 * | 3/2020 | Hagi | G06N 3/042 |
| 10,771,500 | B2 | 9/2020 | Khalimonenko et al. | |

(Continued)

OTHER PUBLICATIONS

Lu et al.; A temporal correlation and traffic analysis approach for APT attacks detection; Springer (Year: 2006).*

(Continued)

*Primary Examiner* — Kambiz Zand
*Assistant Examiner* — Mahabub S Ahmed
(74) *Attorney, Agent, or Firm* — KLIGLER & ASSOCIATES PATENT ATTORNEYS LTD

(57) ABSTRACT

An apparatus includes multiple ports, packet communication processing circuitry coupled to the ports, and a processor that is configured to receive, from the packet communication processing circuitry, metadata that is indicative of a temporal pattern of control messages communicated via one or more of the ports, and to identify a network attack by applying anomaly detection to the temporal pattern of the control messages.

30 Claims, 3 Drawing Sheets

(56) References Cited

U.S. PATENT DOCUMENTS

| | | | | |
|---|---|---|---|---|
| 10,776,687 | B2* | 9/2020 | Hawkins | G06N 3/045 |
| 10,824,145 | B1* | 11/2020 | Konrardy | G08G 1/167 |
| 11,195,107 | B1* | 12/2021 | Jiang | G06N 3/063 |
| 11,575,704 | B2* | 2/2023 | MacLeod | H04L 43/0236 |
| 2004/0093521 | A1* | 5/2004 | Hamadeh | H04L 69/161 |
| | | | | 726/22 |
| 2004/0215976 | A1* | 10/2004 | Jain | H04L 63/1458 |
| | | | | 726/23 |
| 2004/0250124 | A1* | 12/2004 | Chesla | G06F 21/552 |
| | | | | 709/224 |
| 2005/0240780 | A1* | 10/2005 | MacIsaac | H04L 43/16 |
| | | | | 713/188 |
| 2006/0053491 | A1* | 3/2006 | Khuti | H04L 63/20 |
| | | | | 709/224 |
| 2007/0294187 | A1* | 12/2007 | Scherrer | H04L 63/1425 |
| | | | | 705/75 |
| 2008/0162679 | A1* | 7/2008 | Maher | H04L 63/1458 |
| | | | | 709/223 |
| 2011/0213869 | A1* | 9/2011 | Korsunsky | G06F 21/55 |
| | | | | 709/223 |
| 2011/0214157 | A1* | 9/2011 | Korsunsky | H04L 63/1425 |
| | | | | 726/1 |
| 2011/0219035 | A1* | 9/2011 | Korsunsky | G06F 21/00 |
| | | | | 707/E17.005 |
| 2012/0233311 | A1* | 9/2012 | Parker | H04L 43/022 |
| | | | | 709/224 |
| 2013/0333036 | A1* | 12/2013 | Lahann | G06F 21/56 |
| | | | | 726/23 |
| 2013/0343379 | A1* | 12/2013 | Stroud | H04L 43/06 |
| | | | | 370/389 |
| 2014/0157405 | A1* | 6/2014 | Joll | H04L 63/1425 |
| | | | | 726/22 |
| 2014/0248852 | A1* | 9/2014 | Raleigh | H04W 12/068 |
| | | | | 455/566 |
| 2014/0380466 | A1* | 12/2014 | Schultz | H04L 63/1408 |
| | | | | 726/22 |
| 2015/0081890 | A1* | 3/2015 | Richards | H04M 15/47 |
| | | | | 709/224 |
| 2015/0106316 | A1* | 4/2015 | Birdwell | G06N 3/086 |
| | | | | 706/33 |
| 2015/0127790 | A1* | 5/2015 | Smith | H04L 41/0873 |
| | | | | 709/221 |
| 2015/0215177 | A1* | 7/2015 | Pietrowicz | H04L 45/02 |
| | | | | 370/230 |
| 2015/0236895 | A1* | 8/2015 | Kay | H04L 67/535 |
| | | | | 709/224 |
| 2015/0281917 | A1* | 10/2015 | Weiss | H04M 1/72436 |
| | | | | 455/419 |
| 2015/0339570 | A1* | 11/2015 | Scheffler | G06N 3/04 |
| | | | | 706/27 |
| 2016/0055408 | A1* | 2/2016 | Akopyan | G06N 3/04 |
| | | | | 706/26 |
| 2016/0086075 | A1* | 3/2016 | Alvarez-Icaza Rivera | |
| | | | | G06N 3/06 |
| | | | | 706/25 |
| 2016/0188396 | A1* | 6/2016 | Sonalker | G06F 11/079 |
| | | | | 714/37 |
| 2016/0261482 | A1* | 9/2016 | Mixer | H04L 43/12 |
| 2016/0359881 | A1* | 12/2016 | Yadav | H04L 63/1408 |
| 2017/0116514 | A1* | 4/2017 | Abel | G06N 3/0675 |
| 2017/0223032 | A1* | 8/2017 | El-Moussa | H04L 63/0428 |
| 2017/0353478 | A1* | 12/2017 | Ishikawa | H04L 63/0236 |
| 2018/0007076 | A1* | 1/2018 | Galula | H04L 69/40 |
| 2018/0020015 | A1* | 1/2018 | Munro | G06F 21/552 |
| 2018/0114137 | A1* | 4/2018 | Ferreira Moreno | G06N 3/008 |
| 2018/0322284 | A1* | 11/2018 | Chiang | G06F 21/577 |
| 2018/0329958 | A1* | 11/2018 | Choudhury | G06F 16/2456 |
| 2018/0365520 | A1* | 12/2018 | Lee | G06N 3/045 |
| 2019/0020680 | A1* | 1/2019 | Khalimonenko | H04L 67/025 |
| 2019/0042910 | A1* | 2/2019 | Krishnamurthy | G06N 3/049 |
| 2019/0042930 | A1* | 2/2019 | Pugsley | G06N 3/088 |
| 2019/0149565 | A1* | 5/2019 | Hagi | G06N 3/042 |
| | | | | 726/23 |
| 2019/0207955 | A1* | 7/2019 | El-Moussa | H04L 63/1408 |
| 2019/0230101 | A1* | 7/2019 | Yajima | H04L 43/16 |
| 2019/0230107 | A1* | 7/2019 | De Sapio | G06N 3/063 |
| 2019/0303740 | A1* | 10/2019 | Arthur | G06N 3/063 |
| 2019/0306011 | A1* | 10/2019 | Fenoglio | H04L 41/16 |
| 2019/0379589 | A1* | 12/2019 | Ryan | G06F 17/142 |
| 2019/0379625 | A1* | 12/2019 | Coffey | H04L 51/18 |
| 2019/0379683 | A1* | 12/2019 | Overby | H04W 12/122 |
| 2019/0385057 | A1* | 12/2019 | Litichever | H04L 63/14 |
| 2019/0392001 | A1* | 12/2019 | Carothers | G06N 3/049 |
| 2020/0053567 | A1* | 2/2020 | Monshizadeh | H04W 12/128 |
| 2020/0106806 | A1* | 4/2020 | Gupta | H04L 61/4511 |
| 2020/0228569 | A1* | 7/2020 | El-Moussa | G06N 3/045 |
| 2020/0285737 | A1* | 9/2020 | Kraus | G06F 21/552 |
| 2020/0285997 | A1* | 9/2020 | Bhattacharyya | G06N 7/00 |
| 2020/0287971 | A1* | 9/2020 | Mousset | B61L 25/025 |
| 2020/0322368 | A1* | 10/2020 | Cohen | H04L 63/1425 |
| 2020/0342311 | A1* | 10/2020 | Peroulas | G06N 3/08 |
| 2020/0366690 | A1* | 11/2020 | Cheng | G06N 3/08 |
| 2020/0387797 | A1* | 12/2020 | Ryan | G06N 3/084 |
| 2020/0389469 | A1* | 12/2020 | Litichever | H04W 4/40 |
| 2021/0021623 | A1* | 1/2021 | Shadrin | H04L 63/1425 |
| 2021/0026343 | A1* | 1/2021 | Konashi | H04L 69/40 |
| 2021/0067468 | A1* | 3/2021 | Cidon | H04L 67/1097 |
| 2021/0099467 | A1* | 4/2021 | March | H04L 63/1416 |
| 2021/0160264 | A1* | 5/2021 | Adir | H04L 63/123 |
| 2021/0168164 | A1* | 6/2021 | El-Moussa | H04L 63/1433 |
| 2021/0192314 | A1* | 6/2021 | Aarts | G06N 3/044 |
| 2021/0216625 | A1* | 7/2021 | Miller | G06F 21/602 |
| 2021/0216630 | A1* | 7/2021 | Karr | H04L 63/1416 |
| 2021/0224388 | A1* | 7/2021 | Blemel | G06F 21/566 |
| 2021/0288984 | A1* | 9/2021 | Jones | H04L 63/145 |
| 2021/0352090 | A1* | 11/2021 | Kim | H04L 67/55 |
| 2021/0383010 | A1* | 12/2021 | Massiglia | G06F 21/552 |
| 2022/0050023 | A1* | 2/2022 | Lavazais | G01M 99/005 |
| 2022/0053018 | A1* | 2/2022 | Kumar | H04L 69/163 |
| 2022/0086179 | A1* | 3/2022 | Levin | G06F 16/285 |
| 2022/0092191 | A1* | 3/2022 | Doukhvalov | G06F 21/562 |
| 2022/0180173 | A1* | 6/2022 | Jonnalagadda | G06N 3/04 |
| 2023/0053772 | A1* | 2/2023 | Zinner | H04J 3/0661 |

OTHER PUBLICATIONS

Lee et al.; A Data Mining Framework for Building Intrusion Detection Models; IEEE (Year: 1999).*

Widanage1 et al.; Anomaly Detection over Streaming Data: Indy500 Case Study; IEEE (Year: 2019).*

Chen et al.; An Rad: A Neuromorphic Anomaly Detection Framework for Massive Concurrent Data Streams; IEEE (Year: 2018).*

Wan et al.; Characterizing and Mining Traffic Patterns of IoT Devices in Edge Networks; IEEE (Year: 2020).*

Kalech; Cyber-attack detection in SCADA systems using temporal pattern recognition techniques; elsevier (Year: 2019).*

Bilge et al.; DISCLOSURE: Detecting Botnet Command and Control Servers Through Large-Scale NetFlow Analysis; ACSAC '12 Dec. 3-7, 2012, Orlando, Florida USA Copyright 2012 ACM 978-1-4503-1312—Apr. 12, 2012 (Year: 2012).*

Aimakrami,; Intrusion Detection System for Smart Meters; IEEE (Year: 2016).*

Jiang et al.; Network Anomaly Detection through Traffic Measurement; down loaded from google.com (Year: 2010).*

Monowar et al.; Network Anomaly Detection: Methods, Systems and Tools; IEEE (Year: 2014).*

Robinson E. Pino et al.; Neuromorphic Computing for Cognitive Augmentation in Cyber Defense; springer (Year: 2014).*

Shlomo et al.; Temporal pattern-based malicious activity detection in SCADA systems; elsevier (Year: 2020).*

Lane et al.; Temporal Sequence Learning and Data Reduction for Anomaly Detection; acm.org (Year: 1999).*

Yu et al.; Towards Neural Network Based Malware Detection on Android Mobile Devices; springer (Year: 2014).*

Sakib et al.; Using Anomaly Detection Based Techniques to Detect HTTP-based Botnet C&C Traffic; IEEE (Year: 2016).*

(56) References Cited

OTHER PUBLICATIONS

Lyon, G., "Chapter 5. Port Scanning Techniques and Algorithms", Introduction, Nmap Network Scanning book, pp. 1-3, year 2009, downloaded from https://nmap.org/book/scan-methods.html.

Nvidia Corporation, "What Just Happened", pp. 1-4, year 2021 downloaded from https://www.mellanox.oom/products/what-just-happened.

* cited by examiner

REAL-TIME DETECTION OF NETWORK ATTACKS

FIELD OF THE INVENTION

The present invention relates generally to network communications, and particularly to detection of network attacks in communication networks.

BACKGROUND OF THE INVENTION

Systems for detecting cyberattacks on network communications infrastructure have been previously proposed in the patent literature. For example, U.S. Pat. No. 10,771,500 describes systems and methods for detecting distributed denial-of-service (DDoS) attack. An exemplary method includes receiving one or more requests from a first user for a service executing on a server, and generating a first vector associated with the first user comprised of a plurality of characteristics indicative of the first user accessing the service; calculating a comparison between the first vector and a reference vector, wherein the reference vector comprises an averaged distribution of characteristics for a plurality of users accessing the service, and determining that the service is under a denial-of-service attack based on the comparison between the first vector and the reference vector. System modules may be implemented as actual devices, systems, components, a group of components realized with the use of hardware, such as a microprocessor system and a set of software instructions, as well as neuromorphic chips.

SUMMARY OF THE INVENTION

An embodiment of the present invention that is described herein after provides an apparatus including multiple ports, packet communication processing circuitry coupled to the ports, and a processor that is configured to receive, from the packet communication processing circuitry, metadata that is indicative of a temporal pattern of control messages communicated via one or more of the ports, and to identify a network attack by applying anomaly detection to the temporal pattern of the control messages.

In some embodiments, the packet communication processing circuitry is configured to distinguish between the control messages and data packets, and to generate the metadata based on the control messages and not of the data packets.

In some embodiments, the metadata includes counts of the control messages. In other embodiments, each of the counts corresponds to a respective time window and a respective port.

In an embodiment, wherein the network attack includes a port scanning attack. In another embodiment, the processor is configured to apply the anomaly detection by applying an artificial neural network (ANN).

In yet another embodiment, the processor includes a neuromorphic processor that is configured to use the ANN in an inference-only mode to detect an anomaly in the temporal pattern of the control messages. In a further embodiment, the processor includes one of a tensor-processing-unit (TPU) and a graphical-processing-unit (GPU), and wherein the ANN is trained to detect an anomaly in the temporal pattern of the control messages.

In some embodiments, the control messages include transmission control protocol (TCP) messages.

In some embodiments, the control messages include user datagram protocol (UDP) messages.

In other embodiments, the control messages include internet control message Protocol (ICMP) messages.

In an embodiment, the processor is configured to indicate an occurrence of the network attack in real-time. In another embodiment, the packet communication processing circuitry includes a multi-port switch fabric.

In some embodiments, the ports, the packet communication processing circuitry and the processor are integrated in a network device.

In some embodiments, the packet communication processing circuitry and the processor are integrated in a single integrated circuit (IC).

There is additionally provided, in accordance with another embodiment of the present invention, a method, including, using packet communication processing circuitry that is coupled to multiple ports, generating metadata that is indicative of a temporal pattern of control messages communicated via one or more of the ports. Using a processor, the metadata is received from the packet communication processing circuitry, and a network attack is identified by applying anomaly detection to the temporal pattern of the control messages.

The present invention will be more fully understood from the following detailed description of the embodiments thereof, taken together with the drawings in which:

DETAILED DESCRIPTION OF EMBODIMENTS

Overview

Figure 1:
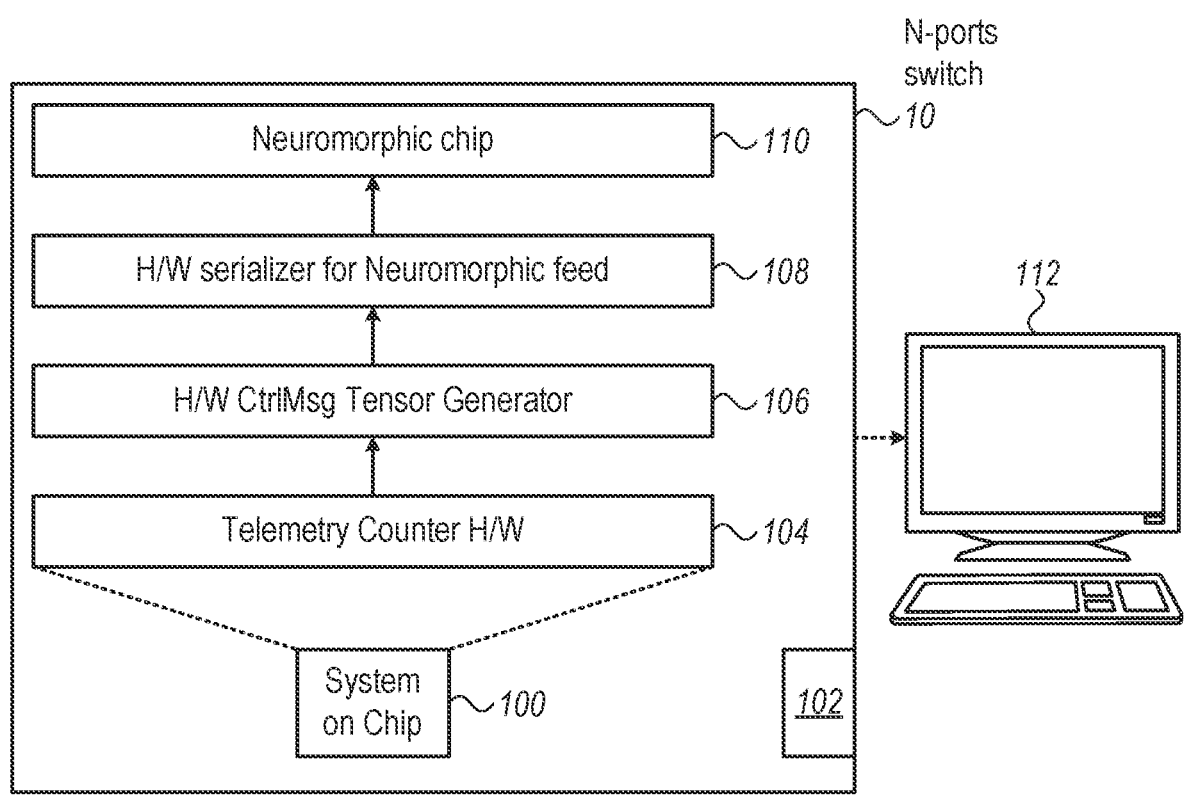
FIG. 1 is a schematic, pictorial block diagram of a system on chip (SoC) inside a network switch, which is configured to detect a reconnaissance attack (RA) in real time, in accordance with an embodiment of the present invention.

A common way to prepare a cyberattack on communication infrastructure, such as distributed denial-of-service (DDoS), is to first perform a reconnaissance attack (RA) on the infrastructure, e.g., to collect probe responses and thus discover available services.

An RA is typically a carefully engineered stealth attack that does not raise an alarm at the target site. An RA usually involves sending synthetic control traffic that generates random probes in an effort to collect the aforementioned probe responses, and thus discover available services. In other words, an RA typically sends adversarial control packets in order to characterize the infrastructure to be attacked. The very low traffic volume and rate of the adversarial control packets, as compared to data traffic volume/rate, makes it practically impossible to detect the RA in real time using existing techniques.

RAs can be implemented with various algorithms. For example, in the case of transport control protocol (TCP) communications, a possible approach is to leverage TCP control messages for connection establishment and tear down, while tricking the remote server into sending responses that reveal whether a port is open or closed and what service it provides. In case of user datagram protocol (UDP) communications, probes may be sent to known service ports with known service requests in anticipation of receiving a response.

Typically, therefore, during an RA a small number of seemingly trustworthy control packets, such as TCP packets, UDP packets, or internet control message protocol (ICMP) packets, are sent to a particular point, such as to an N-port switch. Trying to hide in normal (data) traffic, the adversary network protocol traffic during RA is usually very slow and hence spans a relatively long-time window (e.g., 0.1 milliseconds) in order not to trigger high-traffic anomaly alarms that can be easily captured with simpler observation of statistics. Without an advance warning, the subsequently cyberattacked infrastructure may be damaged with the possibility of severe consequences.

Embodiments of the present invention that are described hereinafter provide systems and methods to detect a network attack such as an RA. The disclosed technique relies on the aforementioned observation that an RA causes an ephemeral traffic pattern anomaly, and that such transient patterns can be detected using models such as artificial intelligence (AI). For example, an RA attack can be detected by an appropriately trained machine learning algorithm run by dedicated hardware.

The disclosed detection technique performs real-time monitoring of ingress and egress traffic of control message packets. In the disclosed technique, a processor analyzes, in real time, metadata that is indicative of a temporal pattern of control messages communicated, e.g., via one or more ports of a network device. The processor identifies an RA on the network device by applying an AI-based anomaly detection algorithm to the temporal pattern of the control message traffic only.

The rationale is that when a port scan (e.g., a TCP port scan) is in progress, the ingress traffic control messages and egress traffic control messages (e.g., TCP messages) that are exchanged in a given time window exhibit a detectable pattern anomaly as compared to normal control message traffic. For example, port scans may probe many dead ports which results in different flows of control message responses from hosts that affect the normal control message traffic pattern as it evolves in time.

Some embodiments of the invention introduce data modelling of metadata, comprising network protocol control messages and related preprocessing, that make it amenable for processing by machine learning (ML) algorithms or other AI tools. For example, an ML algorithm that is suitable for neuromorphic processing can be used, as described below. On the hardware side, the technique provides a system-level design that includes coupling a processor optimized for AI, such as a neuromorphic coprocessor, to a backplane pipeline of a modern high-end switch.

Some embodiments allow integration of a novel real-time early detection module along with standard offline traffic analysis. To this end, the disclosed hardware includes processing circuitry that preprocesses and transforms specific switch telemetry data in real time, e.g., for direct feed to an AI processor, such as a neuromorphic coprocessor, which is configured to instantly detect RAs which happen within a small time-frame of a few milliseconds over an entire set of ports of a network device. Therefore, a security scan of several tens of ports, e.g., of a switch, to detect an RA would take a few milliseconds, making it possible for the disclosed system to monitor hundreds of ports in real time (e.g., at a rate of 100 Hz).

Timely detection of RAs, such as port scans, allows taking proactive measures to mitigate an imminent cyberattack (e.g., DDOS problems), like to establish slowing down of port connection and filtering of malicious IPs, and thereby to protect against severe socioeconomical consequences of such cyberattacks.

System Description

FIG. 1 is a schematic, pictorial block diagram of a system on chip (SoC) 100 inside a network switch 10, which is configured to detect a network attack, e.g., a reconnaissance attack (RA), in real time, in accordance with an embodiment of the present invention. Switch 10 has N ports 102, N typically ranging between 16-128, over which SoC 100 monitors communication. SoC 100 counts control traffic on all ports 102 in parallel, periodically, with a monitoring period in the order of 1 mSec. Control traffic is counted with a temporal resolution (time window) of up to 100 microseconds, and therefore SoC 100 provides a scan rate on the order of 1 KHz with sufficient temporal resolution to detect an RA.

In the present context, the terms "control traffic" and "control messages" are used interchangeably and refer to the process of managing, controlling or reducing the network traffic using dedicated messages. Non-limiting examples of control messages comprise TCP, UDP and ICMP types of messages. Note that in counting control messages, SoC 100 typically distinguishes between control messages and data messages, and considers only the control messages.

For a large number of scanned ports, a smaller time window is sufficient, due to improved statistics on a larger sample of ports. For example, assuming a 5 microsecond time window of scan per port, SoC 100 may monitor a switch, with up to 100 ports, against RA at a scan rate of at least 1 KHz.

To perform its tasks, SoC 100 comprises a telemetry counter 104, which counts the number of ingress and egress control messages communicated over ports 102 at each time window. The multiple ingress and egress counts are converted, using a tensor generator 106, into a mathematical format (e.g., a tensor), suitable as an input to an AI processor. In the shown embodiment, the AI processor is a neuromorphic coprocessor 110 which interfaces using a serialize feeder 108.

If another type of coprocessor is used (e.g., a TPU), other components may be used for interface with telemetry counter 104. Generally, any suitable processor, not necessarily a neuromorphic coprocessor, can be used as processor 110.

Service discovery is comprised of control traffic "probe requests" and "probe responses," so the system updates counters to monitor the response traffic as well. Telemetry counter 104 is therefore already a component of modern high-end switches. The solution leverages existing switching backplane capabilities to update, in real time, a specific collection of counters that monitors control traffic.

Every time window (or epoch), and all of the respective counters (collectively "telemetry counter 104"), are read and fed to an artificial intelligence pipeline (which can be a neuromorphic coprocessor, a TPU or any other device that leverages ML/AI approaches). The intent is to observe control traffic pattern variations that hint at adversarial RA (e.g. a port scan).

The next module, tensor generator 106, receives configurations to generate proper tensors from available counter data. It periodically generates a different tensor set for each ingress and egress path of each switch port and feeds it to the next stage, which serializes the received tensors by mapping them to integers of appropriate resolution and feeds them to the neuromorphic processor. Moreover, this module bridges the timing domains as it is expected that the neuromorphic processors operates at an N times faster frequency where N is the number of available switch ports and frequency is the selected time window.

The output of processor 110, such as real-time indication of an RA, is communicated to a user interface, shown as a display 112.

SoC 100 can be dynamically configured to update counters for different types of control traffic (such as TCP, UDP or application-level custom control traffic). The intent is to monitor all control traffic that might be used as a "probe" for service discovery.

In an embodiment, the disclosed solution is a switching-device-level solution that is integrated in the switch backplane. The switch backplane implements the forwarding of traffic between all available ports and therefore it has access to all packets entering and exiting the device.

Control traffic discussed in this disclosure comprises packets that do not carry data but rather control information for tasks such as, but not limited to, the following:
  Connection establishment and teardown
  Subscription to services
  Flow control
  Retransmission The solution can be a system with a coprocessor located outside a network device, directly coupled, e.g., by a local area link, or a network device that includes the processor, even to a level where the processor and the packet processing circuitry are integrated on the same IC, with the latter option shown in FIG. 1. In other embodiments, the solution can be a system with a coprocessor located in a remote device.

In particular, Soc 100, or another solution, runs a dedicated algorithm as disclosed herein, including in FIG. 3, that enables Soc 100, or another solution, to perform the disclosed steps, as further described below.

By appropriately taking advantage of the neuromorphic coprocessor strengths, the invention significantly improves the response time of RA detection while reducing the overall power consumption and cost of ownership.

In various embodiments, the different elements of SoC 100 shown in FIG. 1 may be implemented using suitable hardware, such as using one or more discrete components, one or more Application-Specific Integrated Circuits (ASICs) and/or one or more Field-Programmable Gate Arrays (FPGAs), or in any other suitable way. Some of the functions of the system may be implemented in a general-purpose processor which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Real-Time Detection of Network Reconnaissance Attacks by Monitoring Network Protocol Traffic As noted above, RAs in the form of port scan attacks leverage network protocol control message sequences to determine open ports and services behind them. To identify a single port-scan sequence, specific packets of ingress and egress traffic should typically be detected and correlated in a time window of at least 0.1 mSec.

Determining network protocol port-scan sequences by observing ingress/egress packets does not scale well in terms of performance. For example, in the context of a datacenter switch with 100 Gbit/sec ethernet ports, determining port scan sequences by correlating control message packets is intractable. Each 100 G switch port processes, on average, 100 million packets per second (combined ingress/egress traffic of average-sized packets). For example, a 48-port 100 Gbit/sec switch configuration would require detection of port scans in a volume of ~5 billion packets per second.

If the datacenter infrastructure is dedicated to a single organization for its operations, RA detection support could be distributed among various servers that host critical services. Port-scan detection, for example, also implies counter-measures, such as banning source IP subnets as close to the internet edge as possible, which is viable if one organization owns the whole infrastructure.

In the context of a datacenter infrastructure that serves a public cloud, the RA detection should be pervasive. Each cloud application might have its own attack counter-measures, especially for services operating in a VPN where switched traffic is encrypted. However, since the infrastructure is shared among many applications, infrastructure-level protection is required as well.

It is therefore evident that it would be beneficial if network switches could provide an early warning of an RA. Notably, switches have already been considered as the ultimate real traffic analysis engines for triaging large network deployment problems and distributed application performance. More specifically, high-end switch fabrics (e.g., Mellanox Spectrum3) feature a wealth of telemetry counters which are updated by corresponding packet classifier hardware that operates at line rate. These software-defined classifiers can be configured to match different packet fields. Subsequently, counter values are periodically aggregated by appropriate switch agents to a central database for offline analysis.

At rates of ~5 billion packets per second, successful identification of control message patterns in telemetry-digested data is currently the only possible method to detect port scan RA activity. Unfortunately, such offline detection causes a critical delay to taking defensive measures. Embodiments of the present invention, and the disclosed AI-based RA monitoring technique, overcomes the above limitations.

Figure 2:
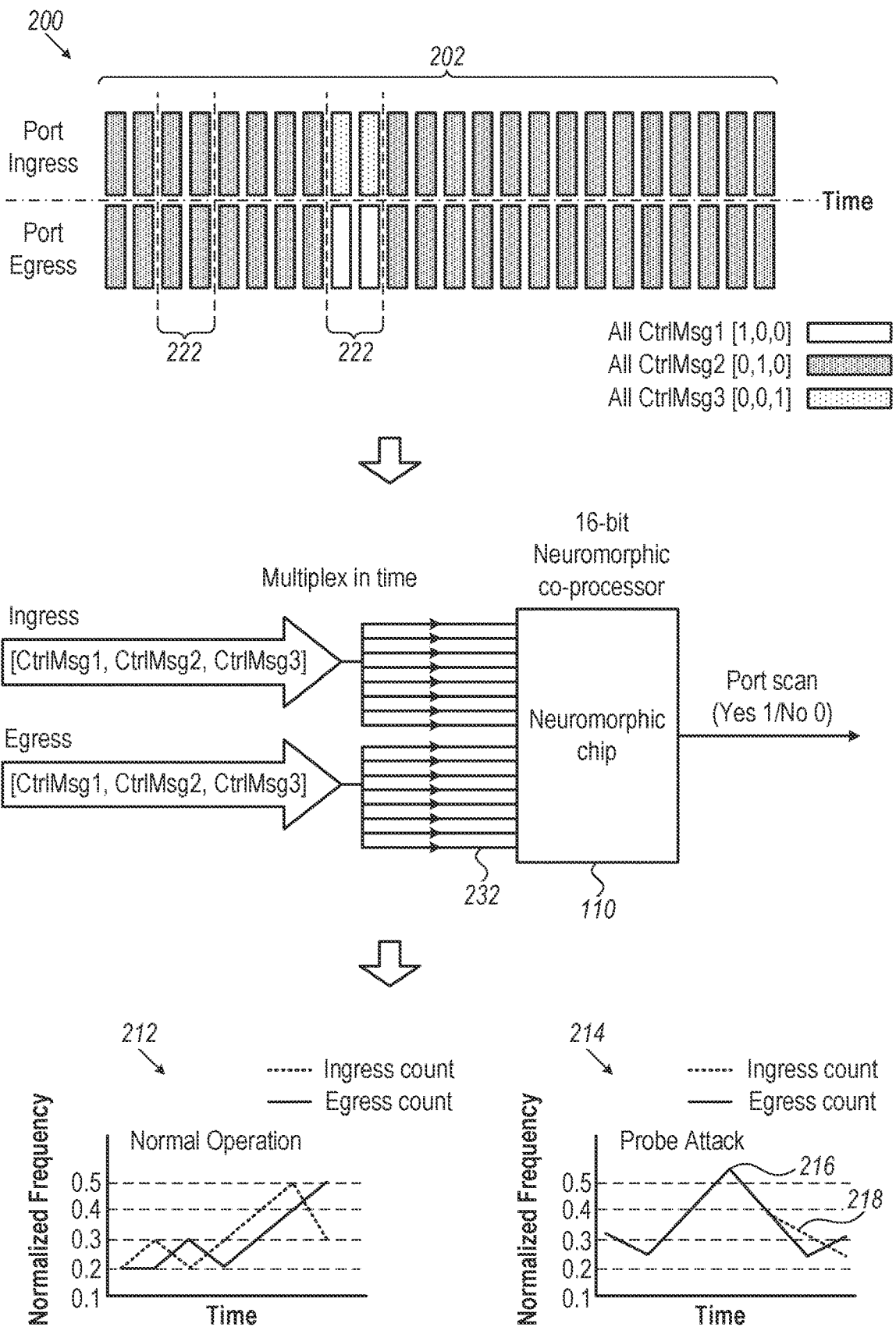
FIG. 2 is a schematic, pictorial diagram of an ingress and egress control traffic assignment scheme of the SoC of FIG. 1, in accordance with an embodiment of the present invention.

FIG. 2 is a schematic, pictorial diagram of an ingress and egress control traffic assignment scheme of SoC 100 of FIG. 1, in accordance with an embodiment of the present invention. FIG. 2 shows how a port scan anomaly appears in a traffic pattern of control messages and how control message traffic is modeled in real time in the disclosed protected network protocol.

In the shown example, port ingress and egress depiction 200 comprises three types of control messages that are assumed to be of interest: CtrlMsg1, CtrlMsg2, and CtrlMsg3. For a TCP protocol, these could be SYN, FIN and RST control messages. These three control messages are mapped, purely for illustration purposes, to gray scale values of white (CtrlMsg1), dark gray (CtrlMsg2), and light gray (CtrlMsg3).

Port ingress and egress depiction 200 provides an example monitoring period 202, sliced into fixed-size smaller time windows 222 which are appropriately shaded according to the mix of control messages observed therein. Port ingress and egress depiction 200 is an example of the protected control message modelling for port-scan anomaly detection by mapping the three example CtrlMsgs to gray-scale values.

Different fixed window representations are used for ingress and egress traffic as the invention mandates independent counting of the activity of each direction. According to the gray-scale mapping, if TotalMsgs seen were all CtrlMsg1 type, then the respective time window would be white and, using the same pattern, CtrlMsg2 would be dark gray and CtrlMsg3 would be light gray.

It is observed, also based on experimental data, that control message traffic patterns normally change type gradually as legal traffic changes during the course of a day, whereas abrupt and more concentrated discolorations imply anomalies, such as port scans. What is even more important is that the type change in control message counts is also, normally, as seen in graph 212, symmetric between ingress and egress ports (possibly within a few time windows offset), which verifies that a type of "probing" (i.e. request/response) is in progress.

In some embodiments, a data preparation and modelling approach is amenable to neuromorphic acceleration, and with an appropriate neural network design, an anomaly such as the one designated in port ingress and egress depiction 200 can be instantly detected.

Assuming a neuromorphic processor with 2M-input resolution, the invention assigns the ingress control message counts tensor to the upper (M) inputs and the egress control message count tensor to the lower (M) inputs. Subsequently, each tensor value is mapped to (M) bit integer, by appropriate hardware, following a simple one-to-one mapping that is mandated by the neuromorphic coprocessor input resolution.

The tensor data are then delivered (232) to neuromorphic processor 110 multiplexed in time, one value at a time. Notably, ingress and egress values that are at the same tensor position are delivered concurrently. The neuromorphic processor internal design that detects RAs is out of the scope of this invention, but the standard design approach is expected to be sufficient: initial volume of legal traffic pattern should be provided for training which will in turn provide initial weight adjustment of the neural network. Subsequently, the neural network should be designed to trigger the output on observation of abrupt pattern violations such as the ones induced by an RA, whereas it should employ the inherent incremental learning functions to adapt to the legal traffic pattern variations as they slowly evolve in time.

As RA probes for active services fail most of the time, this introduces an "anomaly", seen in graph 214, in the probe traffic pattern in two dimensions: i) subtle probe traffic-rise 216, and ii) abnormal variance 218 in the response time delta, as seen in graph 214.

Detection Algorithm Description

Assume N counters under Counter 104 for N distinct control message types: Count1, ..., CountN, with TotalMsg being the total number of control messages. The algorithm defines a tensor with normalized inputs (with a value between 0 and 1) as follows:

[Count1/TotalMsgs, ..., CountN/TotalMsgs]

This is the formulated input that represents the traffic pattern and can be fed to an artificial intelligence pipeline. Such input is obtained for every timeslot (or epoch) 222 which needs to be very fine grained (e.g., every counter update).

SoC 100 assembles different tensors for the ingress (incoming) and for the egress (outgoing) traffic.

With normal operation, services are known and control sequences typically succeed. That slightly delays the responses as servers do housekeeping tasks before sending back a response. Typically, there is a symmetry in the normal control message sequences, the ingress traffic pattern being similar to the egress traffic pattern with a shift in time.

With the attack control message sequence, most probes fail. In such cases (when a service is not available) the response comes back faster and can be captured by tighter shifts in time, slightly more volume and also greater variance.

From one perspective, if the depicted shift is fixed, or at least falls within a pre-defined range, then only a simple algorithm is needed to detect it.

The AI algorithm is configured to determine what should be considered as a legal or permissible shift or alteration in the traffic pattern for each given time slot, since very specific shift value boundaries change over time depending on the traffic, thus cannot be precisely defined.

The underlining concept is as follows:

When probing for a service that is not there, an attacker application receives a negative response faster than when the service is up, as the attacked network device needs to perform connection initialization steps that takes "more" time.

The success/fail response "time difference" depends on what the service needs to do and how flooded the network is. Different services and different network loads result in significant variations.

Since RA probes for active services fail most of the time, this introduces an "anomaly" in the probe traffic pattern in two dimensions: i) subtle probe traffic rise, and ii) an abnormal variance in the response time delta.

The disclosed approach is to construct, with an AI algorithm (be it neuromorphic-based or TPU-based neural networks) a fitting function for the normal probe traffic that continuously adapts to the legal request/response volume and temporal variations, and therefore can instantly detect respective anomalies. Note that, with neuromorphic computing, there is no training step, just an inference step; training is pervasive, continuously updated as data is inferenced, a process called approach incremental learning.

Training Step for Design of AI Pipeline

The training step involves the discovery of a fitting function that captures normal operation. If a traffic pattern does not fit, then this is signaled as an attack.

Such a fitting function can be hardcoded inside a neuromorphic chip or a neural network for TPU offloading following the disclosure integration approach.

Disclosed system configurations are configured for real-time detection of network protocol control message traffic pattern anomalies, such as port scans, as depicted in FIG. 1.

The control traffic assignment scheme shown in FIG. 2 is brought by way of example. In practice, for example, hundreds of ports may be scanned in parallel.

Method of Real-Time Detection of Network Ra

Figure 3:
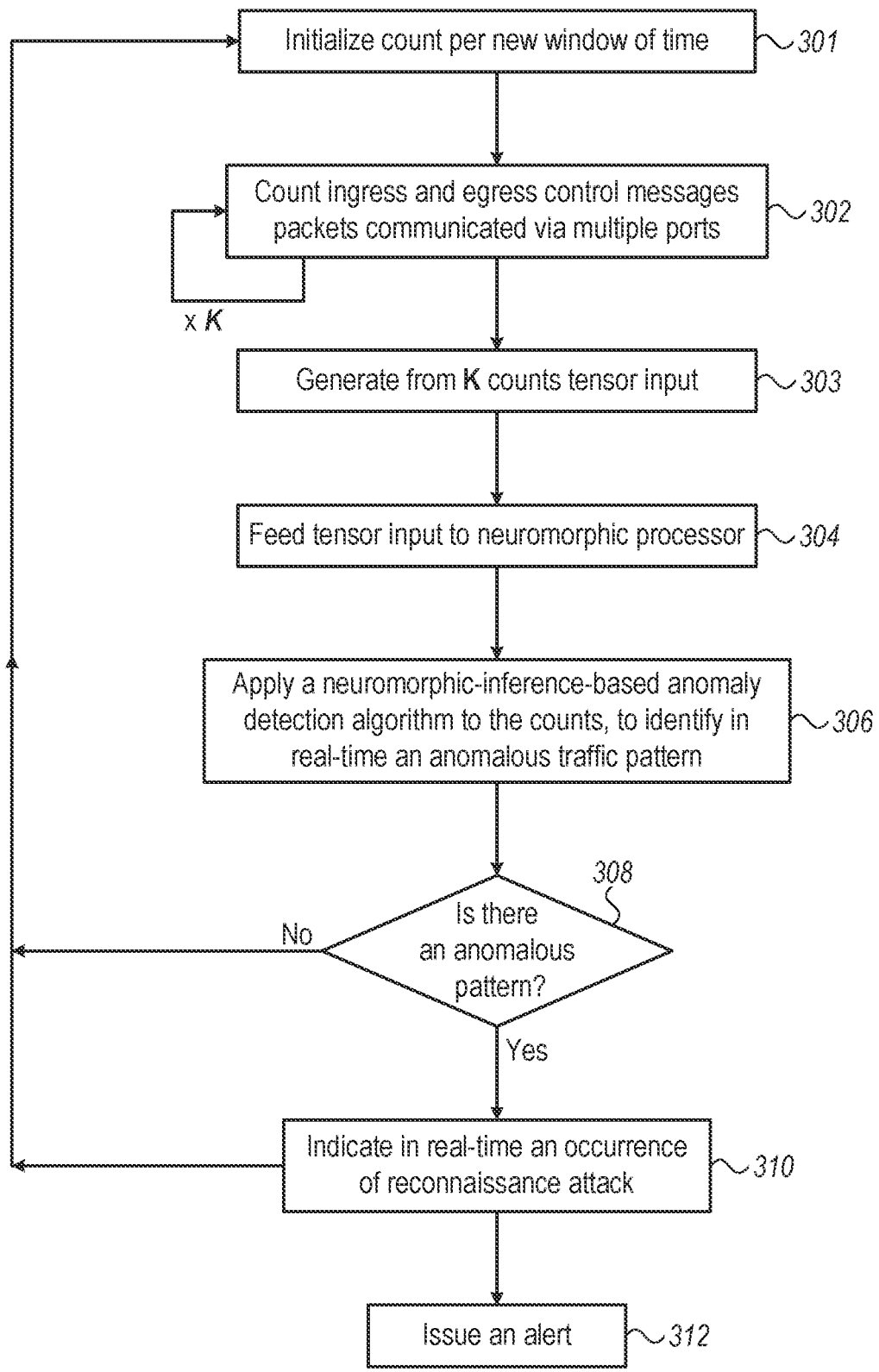
FIG. 3 is a flow chart schematically describing a method for detecting an RA in real time using the SoC of FIG. 1, in accordance with an embodiment of the present invention.

FIG. 3 is a flow chart schematically describing a method for detecting an RA in real time using SoC 100 of FIG. 1, in accordance with an embodiment of the present invention. The algorithm according to the presented embodiment carries out a process that begins with CPU 12 initializing counting per new window of time 202, at a counting initialization step 301.

Next, assuming that there are K time windows 222 in period of counting 202, counter 104 of SoC 100 counts over K successive time windows 222, ingress and egress control message packet traffic through multiple ports during each monitoring period 222, at a counting step 302.

Next, at a tensor generation step 303, tensor generator 106 generates tensor input from the K counts.

At a tensor input feeding step 304, serialize feeder 108 feeds the tensor input to neuromorphic processor 110.

At a control traffic analysis step, neuromorphic processor 110 applies a neuromorphic-inference algorithm, such as described in FIG. 2, to the counts to identify an anomaly in the real-time traffic.

If, at a checking step 303, neuromorphic processor 110 does not identify an anomaly, the process goes back to step 301 to start another real-time monitoring session.

If neuromorphic processor 110 identifies an anomaly, the processor indicates, in real time, an occurrence of an RA, at an RA indication step. In an alerting step 312, processor 110 uses an alert, such as an audiovisual alert.

The process then goes back to step 301 to continue the real-time monitoring.

The example flow chart shown in FIG. 3 is chosen purely for the sake of conceptual clarity. For example, another ML processor type (e.g., TPU) and another ML algorithm may be used for the analysis.

Although the embodiments described herein mainly address network communications, the methods and systems described herein can also be used in other applications, such as in domains in which events occur at a very high rate at some central entity, and there is a need to quickly classify them into groups and observe their distribution in a wider time window.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
multiple ports;
packet communication processing circuitry coupled to the ports and configured to:
process traffic communicated via one or more of the ports;
distinguish, in the traffic, between (i) data packets that transfer data, and (ii) control messages that solicit responses and that are separate from the data packets; and
generate metadata that is indicative of a temporal pattern of the control messages; and
a processor, configured to receive the metadata from the packet communication processing circuitry, and to identify a network attack by applying anomaly detection to the temporal pattern of the control messages.

2. The apparatus according to claim 1, wherein the packet communication processing circuitry is configured to generate the metadata based on the control messages and not on the data packets.

3. The apparatus according to claim 1, wherein the metadata comprises counts of the control messages.

4. The apparatus according to claim 3, wherein each of the counts corresponds to a respective time window and a respective port.

5. The apparatus according to claim 1, wherein the network attack comprises a port scanning attack.

6. The apparatus according to claim 1, wherein the processor is configured to apply the anomaly detection by applying an artificial neural network (ANN).

7. The apparatus according to claim 6, wherein the processor comprises a neuromorphic processor that is configured to use the ANN in an inference-only mode to detect an anomaly in the temporal pattern of the control messages.

8. The apparatus according to claim 6, wherein the processor comprises one of a tensor-processing-unit (TPU) and a graphical-processing-unit (GPU), and wherein the ANN is trained to detect an anomaly in the temporal pattern of the control messages.

9. The apparatus according to claim 1, wherein the control messages comprise transmission control protocol (TCP) messages.

10. The apparatus according to claim 1, wherein the control messages comprise user datagram protocol (UDP) messages.

11. The apparatus according to claim 1, wherein the control messages comprise internet control message Protocol (ICMP) messages.

12. The apparatus according to claim 1, wherein the processor is configured to indicate an occurrence of the network attack in real-time.

13. The apparatus according to claim 1, wherein the packet communication processing circuitry comprises a multi-port switch fabric.

14. The apparatus according to claim 1, wherein the ports, the packet communication processing circuitry and the processor are integrated in a network device.

15. The apparatus according to claim 1, wherein the packet communication processing circuitry and the processor are integrated in a single integrated circuit (IC).

16. A method, comprising:
using packet communication processing circuitry that is coupled to multiple ports:
processing traffic communicated via one or more of the ports;
distinguishing, in the traffic, between (i) data packets that transfer data, and (ii) control messages that solicit responses and that are separate from the data packets; and
generating metadata that is indicative of a temporal pattern of the control messages; and
using a processor, receiving the metadata from the packet communication processing circuitry, and identifying a network attack by applying anomaly detection to the temporal pattern of the control messages.

17. The method according to claim 16, wherein generating the metadata is based on the control messages and not on the data packets.

18. The method according to claim 16, wherein the metadata comprises counts of the control messages.

19. The method according to claim 18, wherein each of the counts corresponds to a respective time window and a respective port.

20. The method according to claim 16, wherein the network attack comprises a port scanning attack.

21. The method according to claim 16, wherein applying the anomaly detection comprises applying an artificial neural network (ANN).

22. The method according to claim 21, wherein the processor comprises a neuromorphic processor, and wherein applying the ANN comprises applying the ANN in an inference-only mode to detect an anomaly in the temporal pattern of the control messages.

23. The method according to claim 21, wherein the processor comprises one of a tensor-processing-unit (TPU) and a graphical-processing-unit (GPU), and wherein applying the ANN comprises applying an ANN that is trained to detect an anomaly in the temporal pattern of the control messages.

24. The method according to claim 16, wherein the control messages comprise transmission control protocol (TCP) messages.

25. The method according to claim 16, wherein the control messages comprise user datagram protocol (UDP) messages.

26. The method according to claim 16, wherein the control messages comprise internet control message Protocol (ICMP) messages.

27. The method according to claim 16, wherein indicating the occurrence of the network attack comprises indicating the occurrence of the network attack in real-time.

28. The method according to claim 16, wherein the packet communications processing circuitry comprises a multi-port switch fabric.

29. The method according to claim 16, wherein the ports, the packet communication processing circuitry and the processor are integrated in a network device.

30. The method according to claim 16, wherein the packet communication processing circuitry and the processor are integrated in a single integrated circuit (IC).

* * * * *